US010635521B2

(12) United States Patent
Chen et al.

(10) Patent No.: US 10,635,521 B2
(45) Date of Patent: Apr. 28, 2020

(54) CONVERSATIONAL PROBLEM DETERMINATION BASED ON BIPARTITE GRAPH

(71) Applicant: INTERNATIONAL BUSINESS MACHINES CORPORATION, Armonk, NY (US)

(72) Inventors: Hao Chen, Beijing (CN); Ya Bin Dang, Beijing (CN); Qi Cheng Li, Beijing (CN); Shao Chun Li, Beijing (CN); Li Jun Mei, Beijing (CN); David Nahamoo, Great Neck, NY (US); Jian Wang, Beijing (CN); Yi Peng Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 15/844,434

(22) Filed: Dec. 15, 2017

(65) Prior Publication Data

US 2019/0188067 A1   Jun. 20, 2019

(51) Int. Cl.
*G06F 11/07* (2006.01)
(52) U.S. Cl.
CPC ........ *G06F 11/079* (2013.01); *G06F 11/0709* (2013.01); *G06F 11/0751* (2013.01); *G06F 11/0775* (2013.01)
(58) Field of Classification Search
CPC .... G06F 11/07; G06F 11/079; G06F 11/0709; G06F 11/0751; G06F 11/0775
(Continued)

(56) References Cited

U.S. PATENT DOCUMENTS

| 5,661,668 A | * | 8/1997 | Yemini | ............... | G06F 11/2257 |
| | | | | | 702/186 |
| 6,279,125 B1 | * | 8/2001 | Klein | .................. | G06F 11/2257 |
| | | | | | 714/38.13 |

(Continued)

FOREIGN PATENT DOCUMENTS

WO   2009097435 A1   8/2009

OTHER PUBLICATIONS

Chaochun Liu et al., "Augmented LSTM Framework to Construct Medical Self-diagnosis Android," IEEE; 2016, pp. i-x.

*Primary Examiner* — Kamini B Patel
(74) *Attorney, Agent, or Firm* — Intelletek Law Group, PLLC; Gabriel Daniel, Esq.

(57) ABSTRACT

A cognitive conversation system that generates effective diagnostic questions is provided. The cognitive conversation system receives a set of currently known symptoms (or currently available answers to diagnostic questions) of a reported problem or fault. The system identifies (i) a set of possible root causes of the reported problem based on the currently known symptoms and (ii) probabilities for the set of possible root causes by using a bipartite graph data structure that links possible symptoms with possible root causes. Upon determining that at least one possible root cause has a probability that is higher than a threshold, the system presents an explanation or solution associated with the at least one possible root cause. Upon determining that none of the possible root causes in the set of possible root causes has a probability higher than the threshold, the system presents a question based on information entropy that is computed based on probabilities of the identified possible root causes.

13 Claims, 7 Drawing Sheets

(58) Field of Classification Search
USPC ............................................. 714/37
See application file for complete search history.

(56) References Cited

U.S. PATENT DOCUMENTS

| | | | |
|---|---|---|---|
| 6,475,143 | B2 | 11/2002 | Iliff |
| 8,727,979 | B2 | 5/2014 | Iliff |
| 9,117,447 | B2* | 8/2015 | Gruber .................... G10L 15/22 |
| 10,395,641 | B2* | 8/2019 | Dhoolia |
| 2007/0282852 | A1* | 12/2007 | Lakshminarayanan ...................... G06Q 10/10 |
| 2008/0208841 | A1* | 8/2008 | Zeng ................... G06F 16/3338 |
| 2010/0192013 | A1* | 7/2010 | Krishnan .............. G06F 11/079 714/26 |
| 2012/0102371 | A1* | 4/2012 | Tonouchi ........... G05B 23/0275 714/49 |
| 2012/0173243 | A1* | 7/2012 | Anand ................ H04M 3/4936 704/270.1 |
| 2012/0185736 | A1* | 7/2012 | Sambamurthy ....... G06F 11/079 714/47.3 |
| 2013/0054435 | A1 | 2/2013 | Zhang et al. |
| 2014/0359544 | A1* | 12/2014 | Hsu .................... G03F 7/70433 716/55 |
| 2018/0108066 | A1* | 4/2018 | Kale ....................... G06N 3/02 |
| 2018/0226067 | A1* | 8/2018 | Dhoolia ................. G10L 15/01 |
| 2019/0114513 | A1* | 4/2019 | Mei ...................... G06K 9/6263 |
| 2019/0138595 | A1* | 5/2019 | Galitsky ............ G06F 17/2715 |
| 2019/0141708 | A1* | 5/2019 | Chen ................. H04W 72/0453 |
| 2019/0149489 | A1* | 5/2019 | Akbulut ................ G06N 20/00 709/206 |
| 2019/0213284 | A1* | 7/2019 | Anand ................ G06F 3/0484 |

* cited by examiner

CONVERSATIONAL PROBLEM DETERMINATION BASED ON BIPARTITE GRAPH

BACKGROUND

Technical Field

The present disclosure generally relates to a cognitive conversation system.

Description of the Related Art

When an equipment fault occurs, the equipment user usually consults an equipment expert (e.g., a call center) to diagnose and fix the fault. An experienced equipment expert at a call center usually effectively leads an iterative diagnosis conversation with an equipment user to discover more and more symptoms, tries different solutions, pinpoints the root causes, and eventually fixes the fault. A cognitive conversation system (e.g., a bot) can be built for a specific equipment and act as the equipment expert to determine fault in the specific equipment and propose solutions to fix the fault.

SUMMARY

Some embodiments of the disclosure provide a cognitive conversation system that generates effective diagnostic questions. Effective diagnostic questions enable the cognitive conversation system to uncover relevant failure symptoms and to quickly converge onto possible solutions.

In some embodiments, the cognitive conversation system conducts a conversation over a user interface device. The system harvests a set of symptoms from a conversation between the computer and a user. The set of symptoms is related to a reported problem. The system retrieves a bipartite graph data structure that links possible root causes with possible symptoms from a memory of the computer. The system identifies (i) a set of possible root causes of the reported problem based on the set of symptoms and (ii) a probability for each possible root cause in the set of possible root causes by using the bipartite graph data structure. Upon determining that at least one possible root cause has a probability that is higher than a threshold, the system presents, as part of the conversation, an explanation or solution associated with the at least one possible root cause having a probability that is higher than the threshold. Upon determining that none of the possible root causes in the set of possible root causes has a probability higher than the threshold, the system presents as part of the conversation, a question based on an information entropy that is computed based on each of the probabilities of the identified possible root causes of the set of root causes.

The cognitive conversation system identifies one or more possible symptoms in addition to the set of symptoms for the set of possible root causes. The presented question is selected from a set of candidate questions that are associated with the identified possible symptoms. The cognitive conversation system selects the question by identifying a candidate question that achieves a greatest reduction in the information entropy among the set of candidate questions. The information entropy is computed based on the probabilities of the different possible root causes. The reduction in the information entropy is computed based on the probabilities of (i) different possible symptoms associated with the candidate question and (ii) links between the different possible symptoms associated with the candidate question and the possible root causes.

In some embodiments, the cognitive conversation system creates the bipartite graph data structure by extracting symptoms, root causes, and relationship between symptoms and root causes from historical records. The cognitive conversation system uses the bipartite graph data structure to identify the relationships between possible symptoms and possible root causes. The bipartite graph data structure links possible symptoms with possible root causes and stores probabilities associated with the possible symptoms and the possible root causes. The cognitive conversation system updates the data structure based on a response to the presented question or the presented explanation The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a cognitive conversation system that generates effective diagnostic questions. Effective diagnostic questions enable the cognitive conversation system to uncover relevant failure symptoms and to quickly converge onto possible solutions. In some embodiments, the cognitive conversation system receives a set of currently known symptoms (or currently available answers to diagnostic questions) of a reported problem or fault. The system identifies a set of possible root causes of the reported problem based on the currently known symptoms. The system also identifies probabilities for the set of possible root causes. When at least one possible root cause has a probability that is higher than a threshold, the system presents an explanation or solution associated with the at least one possible root cause. When none of the possible root causes in the set of possible root causes has a probability higher than the threshold, the system presents a question based on information entropy that is computed based on probability of the identified possible root causes.

Figure 1:
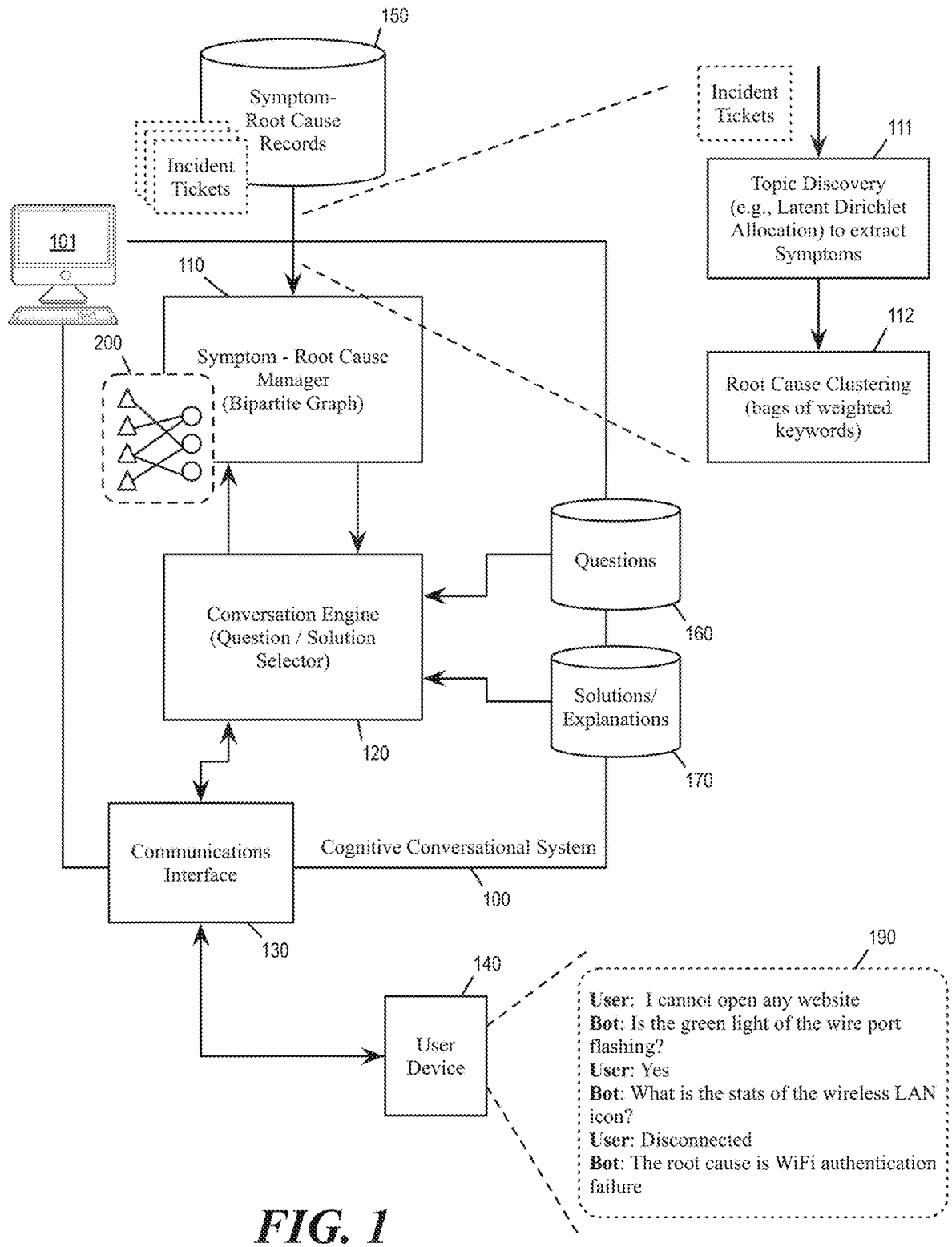
FIG. 1 illustrates a block diagram of a cognitive conversation system, consistent with an exemplary embodiment.

FIG. 1 illustrates a block diagram of a cognitive conversation system 100, consistent with an exemplary embodiment. The cognitive conversation system 100 is an expert system for a particular type of equipment. The system 100 engages in a conversation 190 with a user of the equipment. By conducting the conversation, the system 100 receives a reported problem, generates diagnostic questions, identifies symptoms, identifies possible root causes, and provides a solution for fixing the reported problem.

The cognitive conversation system 100 is implemented on a computing device 101. The computing device 101 implements a symptom-root-cause manager 110 and a conversation engine 120. In some embodiments, the symptom-root-cause manager 110 and the conversation engine 120 are modules of software instructions being executed by one or more processing units (e.g., a processor) of the computing device 101. In some embodiments, the symptom-root-cause manager 110 and the conversation engine 120 are modules of hardware circuits implemented by one or more integrated circuits (ICs) of an electronic apparatus. Though the modules 110 and 120 are illustrated as being separate modules, their functionalities can be merged into a single module.

In some embodiments, the computing device 101 is equipped with one or more communications interface 130, which allows the cognitive conversation system 100 to communicate with a user device 140 to conduct the conversation 190 through a communications medium such as the Internet, the computing cloud, or any type of wired or wireless networks. The conversation 190 includes outputs of questions or suggestions to the user (by e.g., visual display or audio sound) and/or inputs responses or feedback from the user (by e.g., typing, touch screen selection, human spoken words, etc.) In some embodiments, the computing device 101 is equipped with a user interface (not illustrated) for conducting the conversation 190 with the user at the computing device 101.

The symptom-root-cause manager 110 maintains a data structure 200 based on the conversation 190 conducted with the user. The data structure links possible symptoms with possible root causes and stores probabilities associated with the possible symptoms and the possible root causes. In some embodiments, the data structure 200 is based on a bipartite graph that includes nodes representing the possible symptoms and the possible root causes. The bipartite graph also includes links between the symptom nodes and the root cause nodes to represent the relationship between the possible symptoms and the possible root causes. An example of the symptom-root-cause data structure 200 will be described by reference to FIG. 2 below.

The conversation engine 120 uses the content of the data structure 200 to generate questions or explanations for the conversation 190. The content of the data structure 200 may direct the conversation engine 120 to retrieve and present a particular question (e.g., by retrieving a predefined question from a storage 160) or to retrieve and present a particular solution or explanation (e.g., by retrieving a predefined solutions/explanations from a storage 170). The conversation engine 120 receives the responses or feedbacks from the user through the communications interface 130. The conversation engine 120 relays the received responses to the symptom-root-cause manager 110, which updates the symptom-root-cause data structure 200 by e.g., adding or removing nodes associated with root causes and symptoms, or modifying probabilities associated with symptoms, root causes, and the links between the symptoms and the root causes.

In some embodiments, the cognitive conversation system 100 constructs an initial version of the symptom-root-cause data structure 200 based on historical records 150. These historical records include reports of problems or failures (e.g., incident tickets) related to the type of equipment in the past. These reports may include descriptions of symptoms and the ultimately determined root causes. To construct the symptom-root-cause data structure 200 from the historical records 150, the cognitive conversation system 100 performs topic discovery operations to extract symptoms from the historical records. For some embodiments, this involves using probabilistic topic models (e.g., Latent Dirichlet Allocation) without supervision. This topic discovery operation (at 111) facilitates identification of topics that pervade a large collection of records, and preserves statistical structure of the underlying the documents theme. In some embodiments, the probabilistic topic models implement extensions that allow the cognitive conversation system 100 to analyze a streaming collection of records. The cognitive conversation system 100 also perform root cause clustering operations (at 112) to group similar root causes. Each root cause is represented as a bag of weighted keywords. Keyword weights are determined by the importance and confidence of keywords. Similarity between keywords for clustering of root causes may be measured as the cosine value of two vectors. In some embodiments, the symptoms, root causes, and their relationships extracted from the historical records are stored as a bipartite graph data structure.

Figure 2:
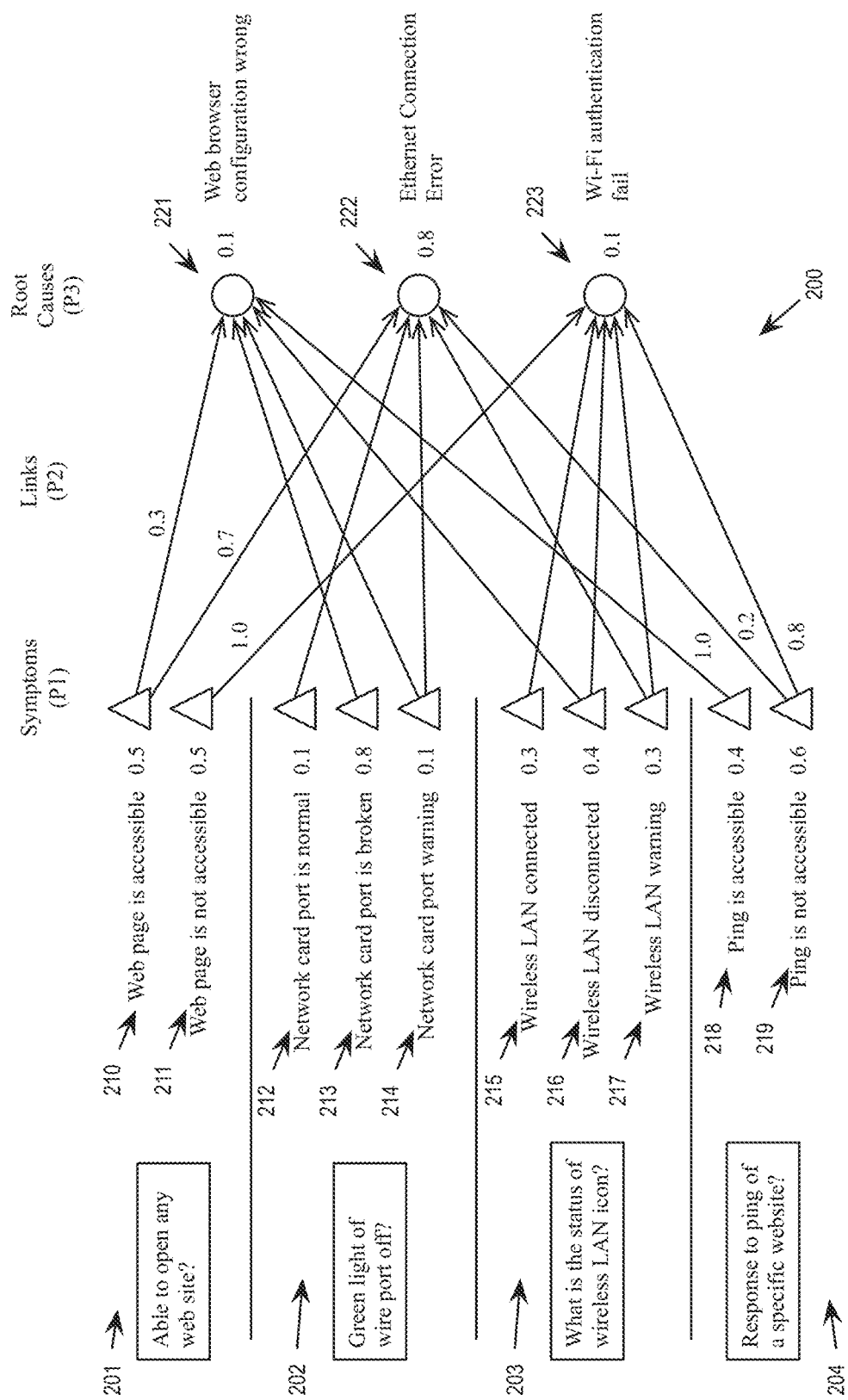
FIG. 2 illustrates an example symptom-root-cause data structure.

FIG. 2 illustrates an example symptom-root-cause data structure 200. As illustrated, the symptom-root-cause data structure 200 is a bipartite graph. The bipartite graph 200 includes nodes 210-219 that correspond to possible symptoms. The bipartite graph also includes nodes 221-213 that correspond to possible root causes. The symptom nodes 210-219 and the root cause nodes 221-213 are interconnected by a set of links representing the relationship between possible symptoms and their corresponding possible root causes.

The symptoms 210-219 are divided into question groups 201-204. Each question group is defined by a question (or a set of related questions), and each symptom of the group is a symptom that can be determined by the question of the group, i.e., the question of the group can be used to determine whether the equipment being reported has the symptom. For example, the question group 201 is defined by the question "able to open any web site". The question group 201 includes symptom 210 "web page is accessible" and symptom 211 "web page is not accessible". The cognitive conversation system 100 can use the user responses to the question "able to open any web site" to determine whether the symptom "web page is accessible" and the symptom "web page is not accessible" are present in the equipment being reported for fault. In some embodiments, a possible symptom that has been determined by a question to be present in the equipment being reported is referred to as a known symptom.

As illustrated, the system 100 assigns three types of probabilities: probability of each symptom (P1), probability of each link between a symptom and a root cause (P2), and probability of each root cause (P3). The system 100 assigns these probabilities based on subject matter expert (SME) knowledge, the historical record 150, and/or user responses to questions from the conversation 190.

The probability (P1) assigned to each symptom of a question group is based on the ratio between the reported instances of the symptom and reported instances of all symptoms of the question group. In some embodiments, the probabilities of symptoms of a question group add up to 1.0. This is because the symptoms of a question group are mutually exclusive and complementary. In other words, for the equipment being reported, one and only one of symptoms of question group must be present/true while all other symptoms must be absent/false. For example, for the question group 203, the wireless LAN status must be one and only one of "connected", "disconnected", and "warning", so their respective corresponding probabilities 0.3, 0.4 and 0.3 add up to 1.0. For the question group 204, the response to ping of a specific website must be one and only one of "ping is accessible" and "ping is not accessible", so their respective corresponding probabilities 0.4 and 0.6 add up to 1.0.

The probability (P2) assigned to each link between a symptom and a root cause is based on the ratio between reported instances of the symptom caused by the root cause and all reported instances of the symptom. As illustrated, each possible symptom is linked to one or more of the root causes. Each linked root cause represents a possible root cause of the symptom. The cognitive conversation system 100 assigns each link a probability. The probability of a link between a symptom and a root cause represents the likelihood that the presence of the symptom is caused by the root cause. For example, for the symptom "ping is not accessible" (symptom node 219), the probability of having the root cause "Ethernet connection error" (root cause node 222) is 0.2, while the probability of having the root cause "Wi-Fi authentication fail" (root cause node 223) is 0.8.

Figure 3:
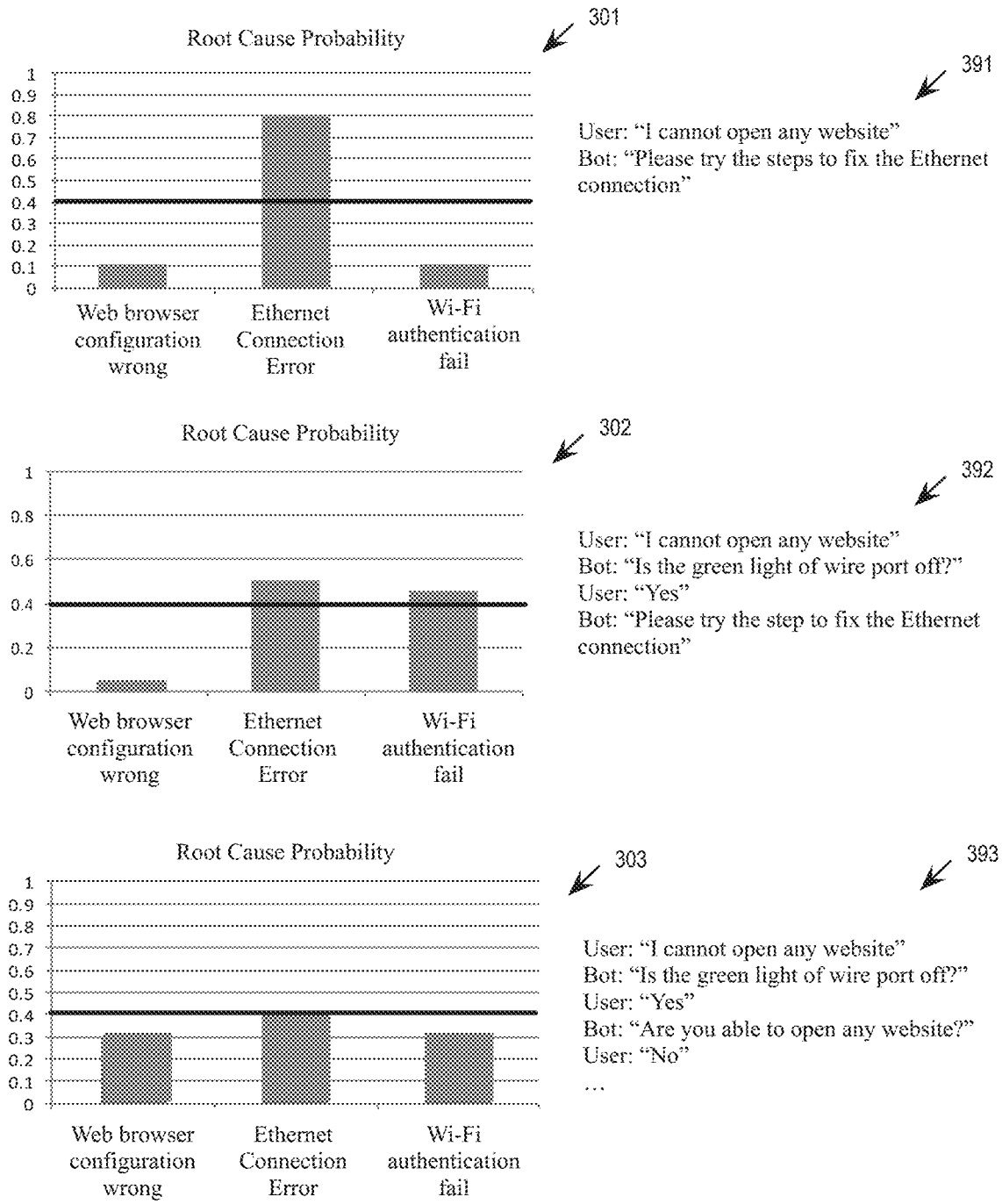
FIG. 3 illustrates the cognitive conversation system presenting an explanation or a solution based on the probabilities assigned to the possible root causes, consistent with an exemplary embodiment.

The probability (P3) assigned to each root cause is based on the ratio between reported instances of the root cause and reported instances of all possible root causes. When a possible root cause has a probability that is higher than a threshold, the system presents an explanation or solution associated with the possible root cause. FIG. 3 illustrates the cognitive conversation system 100 presenting an explanation or a solution based on the probabilities assigned to the possible root causes, consistent with an exemplary embodiment.

The figure illustrates three different example scenarios 301-303 based on the probabilities of the possible root causes. In these examples, the threshold probability for selecting a root cause to present a solution or explanation is 0.4. Each scenario is illustrated with a corresponding conversation between the cognitive conversation system 100 and the user reporting a fault with the equipment.

In the first scenario 301, the user reports in the conversation 391 that he cannot open any website. Based on this reported symptom along with other known symptoms of the equipment, the system 100 determines that the probability of one of the possible root causes "Ethernet connection error" is greater than the threshold 0.4, while the probabilities of all other root causes are less than the threshold. Consequently, the cognitive conversation system 100 presents a solution or explanation to the user that is based on the root cause "Ethernet connection error" in the conversation 391.

In the second scenario 302, the user reports in the conversation 392 that he cannot open any website. Based on this reported symptom, along with other known symptoms of the equipment, the system 100 determines that the probability of two of the possible root causes "Ethernet connection error" and "Wi-Fi authentication fail" have probabilities greater than the threshold 0.4. Instead of presenting solutions or explanations for both possible root causes, the system 100 presents a question to the user through the conversation 392 in order to determine which of the two root causes is more likely. In this example, the system 100 presents the question "is the green light of the wire port off?" Based on the user's affirmative response, the system 100 eliminates "Wi-Fi authentication fail" as a possible root cause. The system 100 in turn presents solution or explanation for the root cause "Ethernet connection error" as part of the conversation 392. In some embodiments, the system uses the bipartite graph data structure 200 to identify a possible symptom and a corresponding question that is most relevant in determining which of the two threshold-exceeding root causes ("Ethernet connection error" or "Wi-Fi authentication fail") is the more likely root cause.

In the third scenario 303, the user reports in the conversation 393 that he cannot open any website. However, none of the possible root causes has a probability that exceed the threshold 0.4. The cognitive conversation system 100 does not suggest a solution or explanation. Instead, the system uses the bipartite graph data structure to identify a question that is most likely to lead the system to converge onto the correct root cause. The question is then presented to the user in the conversation 393.

Figure 4:
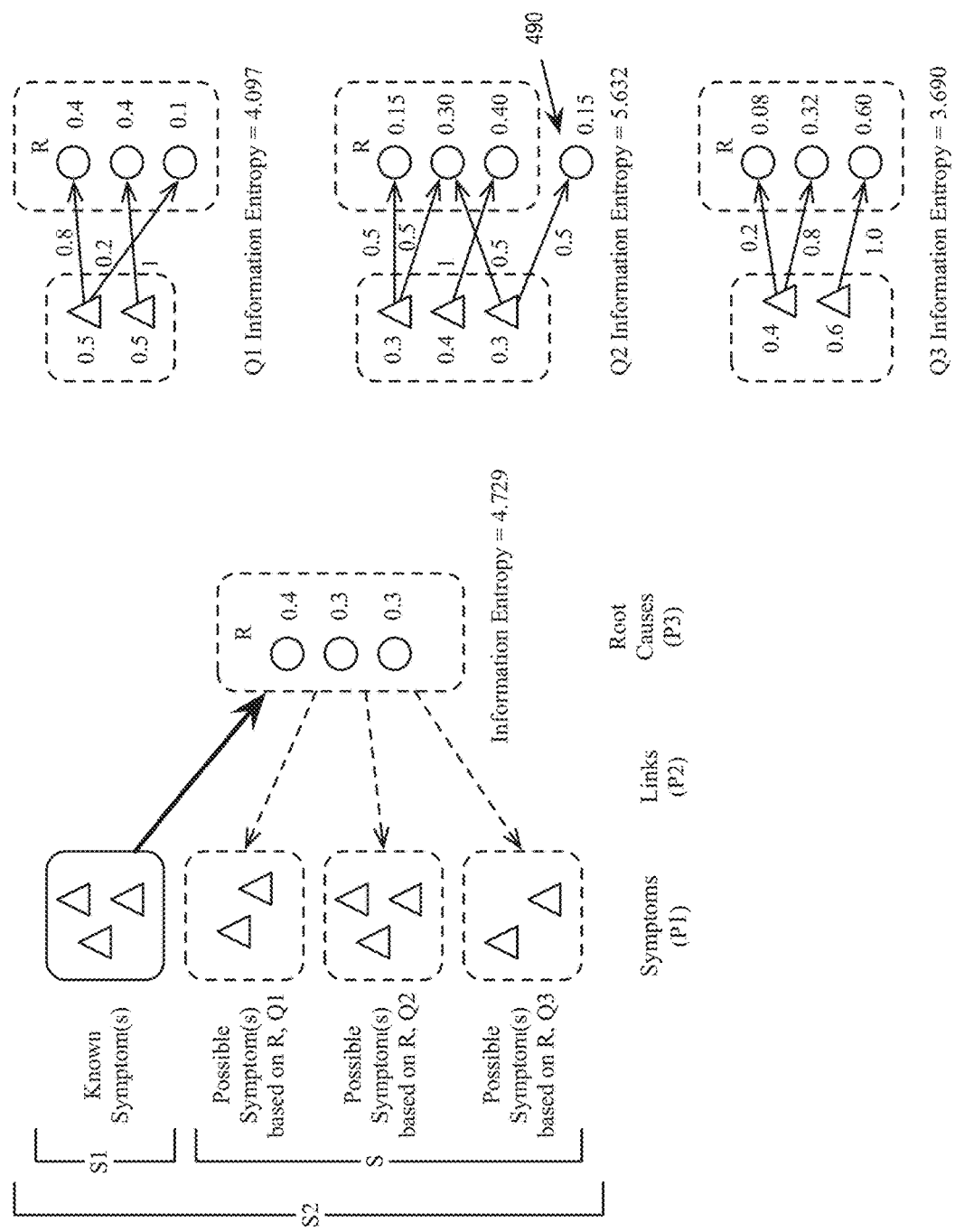
FIG. 4 conceptually illustrates the cognitive conversation system identifying a question in order to converge on a root cause, consistent with an exemplary embodiment.

FIG. 4 conceptually illustrates the cognitive conversation system 100 identifying a question in order to converge on a root cause, consistent with an exemplary embodiment. The cognitive conversion system uses the bipartite graph data structure 200 to identify or select a question to present to the user. The system 100 identifies all possible symptoms for the possible root causes, including possible symptoms that are not currently known to the cognitive conversation system 100. The system then selects or generates the question to be presented to the user from a set of candidate questions based on information entropy reduction.

As illustrated, the bipartite graph data structure 200 has nodes that correspond to a set of known symptoms S1 (these are symptoms of the equipment that are currently known to the cognitive conversation system 100). The bipartite graph data structure 200 also has nodes that correspond to a set of possible root causes R that may cause any of the known symptoms in S1. The possible root causes in the set R may also cause a larger set of possible symptoms S2, which includes the set of known symptoms S1 as well as a set of additional possible symptoms S=S2−S1. As illustrated, the set of additional possible symptoms S includes possible symptoms in a question group for question Q1, possible symptoms in a question group for question Q2, and possible symptoms in a question group for question Q3. Whether the equipment being reported exhibits the symptoms in the set S is unknown to the cognitive conversation system 100.

When none of the possible root causes in the set of R has a probability higher than the threshold, the system 100 presents a question to the user so the system 100 can ascertain the presence or absence of certain symptoms, which can in turn be used to determine which of the possible root causes is most likely the ultimate or correct root cause of the problem. However, there are many possible questions related to many possible symptoms. In order to quickly converge to the ultimate root cause, the cognitive conversation system 100 uses the data structure 200 to generate or identify a most effective question. In some embodiments, the system 100 selects the question from a set of candidate question by identifying a candidate question that achieves a greatest reduction in the information entropy of the problem.

The information entropy of the problem is computed based on the probabilities associated with the root causes. Specifically, the information entropy E of the problem is computed as:

$$E = -\Sigma_{i=1}^{n} P3_i * \log P3_i \quad \text{Eq. (1)}$$

Where:
n is the number of possible root causes, and
P3 is the probability of a root cause.

The reduction of information entropy due to a candidate question is computed based on probabilities of (i) different possible symptoms associated with the candidate question and (ii) links between the different possible symptoms associated with the candidate question and the possible root causes.

The answer to each candidate question would split the set R into m subsets that correspond to m symptoms of the question group. The entropy of question i can be computed as:

$$Es(i) = \sum_{j=1}^{m} \frac{|R_j|}{|R|} \text{entropy}(R_j) = \sum_{j=1}^{m} P1_j \left( -\sum_{k=1}^{n} P2_k \log P2_k \right) \quad \text{Eq. (2)}$$

Where:
$R_j$ is a subset of R that is split off due to question i,
m is the number of symptoms in the question group of question i,
P1 is the probability of a symptom within a question group, and
P2 is the probability of a link of a symptom as described above by reference to FIG. 2.

The reduction in entropy $E_A$ due to question i is computed as:

$$E_A(i) = E - Es(i) \quad \text{Eq. (3)}$$

The system 100 selects the question i with the largest entropy reduction $E_A(i)$.

In the example illustrated in FIG. 4, the information entropy of the problem is computed to be 4.729 according to Eq. (1) based on the probabilities of the possible root causes in the set R. The information entropy of question Q1 is computed to be 4.097 according to Eq. (2) based on the probabilities of the possible symptoms for question group Q1. The information entropy of question Q2 is computed to be 5.632 according to Eq. (2) based on the probabilities of the possible symptoms for question group Q2. The information entropy of question Q3 is computed to be 3.690 according to Eq. (2) based on the probabilities of the possible symptoms for question group Q3. According to the computed information entropies of the different questions, the question Q3 would achieve the greatest reduction in information entropy. Consequently, the cognitive conversation system selects question Q3 for presentation to the user through conversation.

In some embodiments, the selected question may be associated with an additional possible root cause that is not in the set of possible root causes R. In these instances, the system would add the additional possible root cause to the set of possible root causes R. In the example of FIG. 4, the question Q2 is associated with an additional possible root cause 490. The cognitive conversation system 100 may enlarge the set R to include the additional possible root cause 490 and compute the information entropy for the question Q2 based on the enlarged set R.

Figure 5:
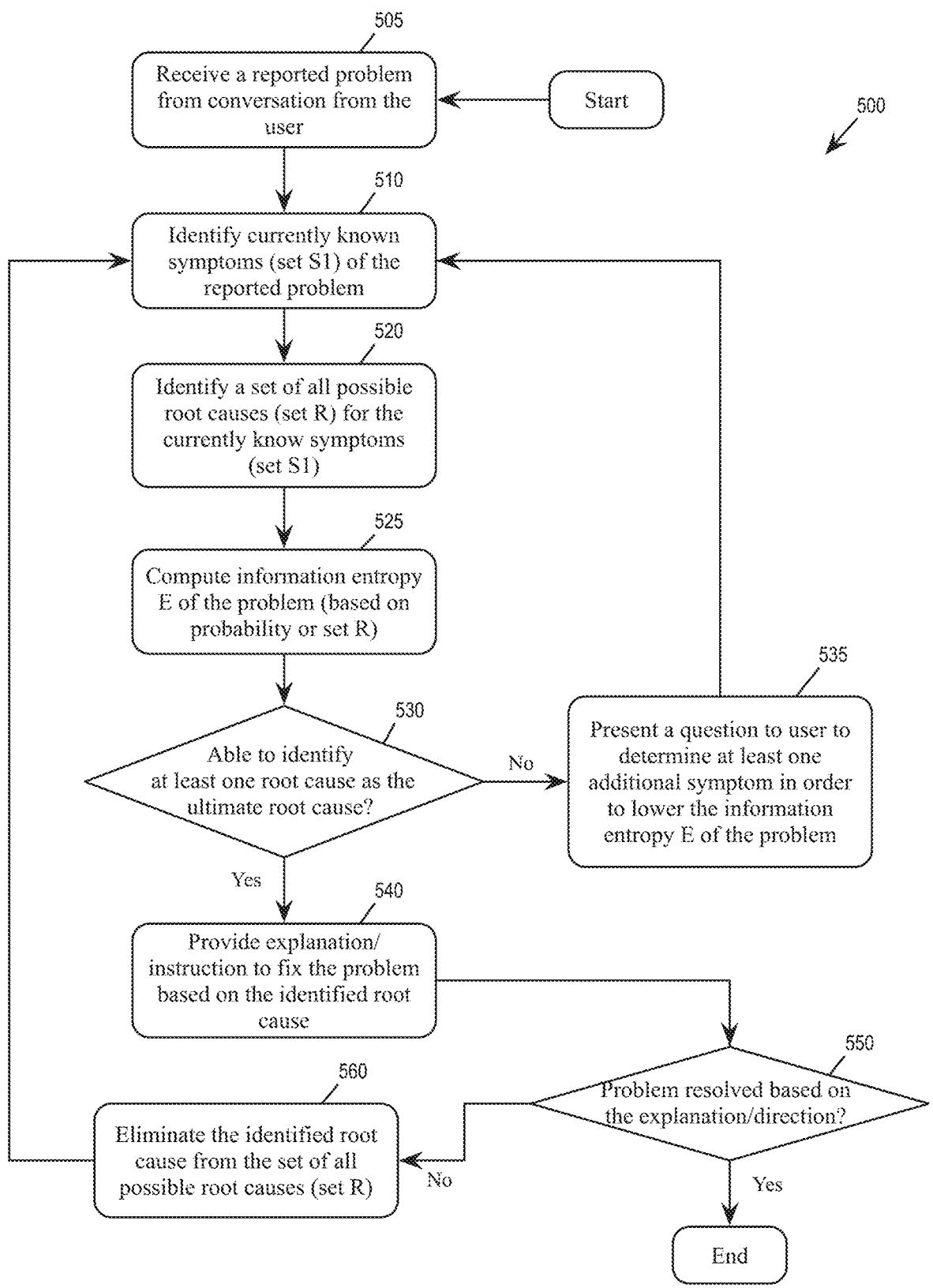
FIG. 5 conceptually illustrates a process for generating questions, explanations, and/or solutions for resolving a reported problem by the cognitive conversation system, consistent with an exemplary embodiment.

FIG. 5 conceptually illustrates a process 500 for generating questions, explanations, and/or solutions for resolving a reported problem by the cognitive conversation system 100, consistent with an exemplary embodiment. In some embodiments, one or more processing units (e.g., processor) of the computing device 101 implementing the cognitive conversation system 100 performs the process 500 by executing instructions stored in a computer readable medium.

Before the start of the process 500, the cognitive conversation system 100 or another computing device collects historical records (e.g., incident tickets) and subject matter expert (SME) knowledge. The cognitive conversation system 100 performs Latent Dirichlet Allocation and root cause clustering on the collected information to extract possible symptoms, root causes, the relationships between the symptoms and the root causes, as well as generating statistics for the symptoms and root causes. The cognitive conversation system 100 constructs a bipartite graph data structure such as 200 that manages and updates the possible symptoms, root causes, and their statistics (e.g., probabilities).

The process 500 starts when the cognitive conversation system 100 receives (at 505) a reported problem from a user through a conversation conducted by the system with the user.

The cognitive conversation system 100 identifies (at 510) currently known symptoms (e.g., set S1) of the reported problem. In some embodiments, a known symptom is a symptom that the system 100 knows to exist through the conversation with the user or the historical record.

The cognitive conversation system 100 identifies (at 520) a set of possible root causes (set R) for the currently known symptoms (set S1). During the operation of the process 500, it is possible for the set of currently known symptoms S1 to expand to include new symptoms, and it is possible for the set of possible root causes R to correspondingly expand to include new root causes.

The cognitive conversation system 100 computes (at 525) information entropy E of the problem. In some embodiments, this information entropy is computed based on the probabilities of the possible root causes in set R according to Eq. (1).

The cognitive conversation system 100 determines whether it is able to identify at least one possible root cause as the ultimate root case. In some embodiments, the system makes this determination by examining whether any of the possible root causes has a probability that is greater than a threshold. If at least one possible root cause has a probability that is greater than the threshold, the process proceeds to

540. If none of the possible root causes has a probability that is greater than the threshold, the process proceeds to 535.

At 535, the system presents a question to the user to determine at least one additional symptom in order to lower the information entropy E of the problem. In some embodiments, the cognitive conversation system 100 performs the operation 535 by performing a process 600, which will be described by reference to FIG. 6 below. The process then returns to 510.

At 540, the cognitive conversation system 100 provides an explanation for the identified root cause or suggests a solution to fix the problem based on the identified root cause.

The system 100 then determines (at 550) whether the identified root cause is correct, e.g., whether the explanation or the solution provided to the user successfully resolves the reported problem. The system makes this determination based on a feedback from the user through the conversation. If the problem is successfully resolved, the process 500 ends. If the feedback for the presented explanation or solution indicates that the explanation or solution is inappropriate for the reported problem, the process 500 returns to 510 after the cognitive conversation system 100 eliminates the identified root cause from the set of possible root causes R.

Figure 6:
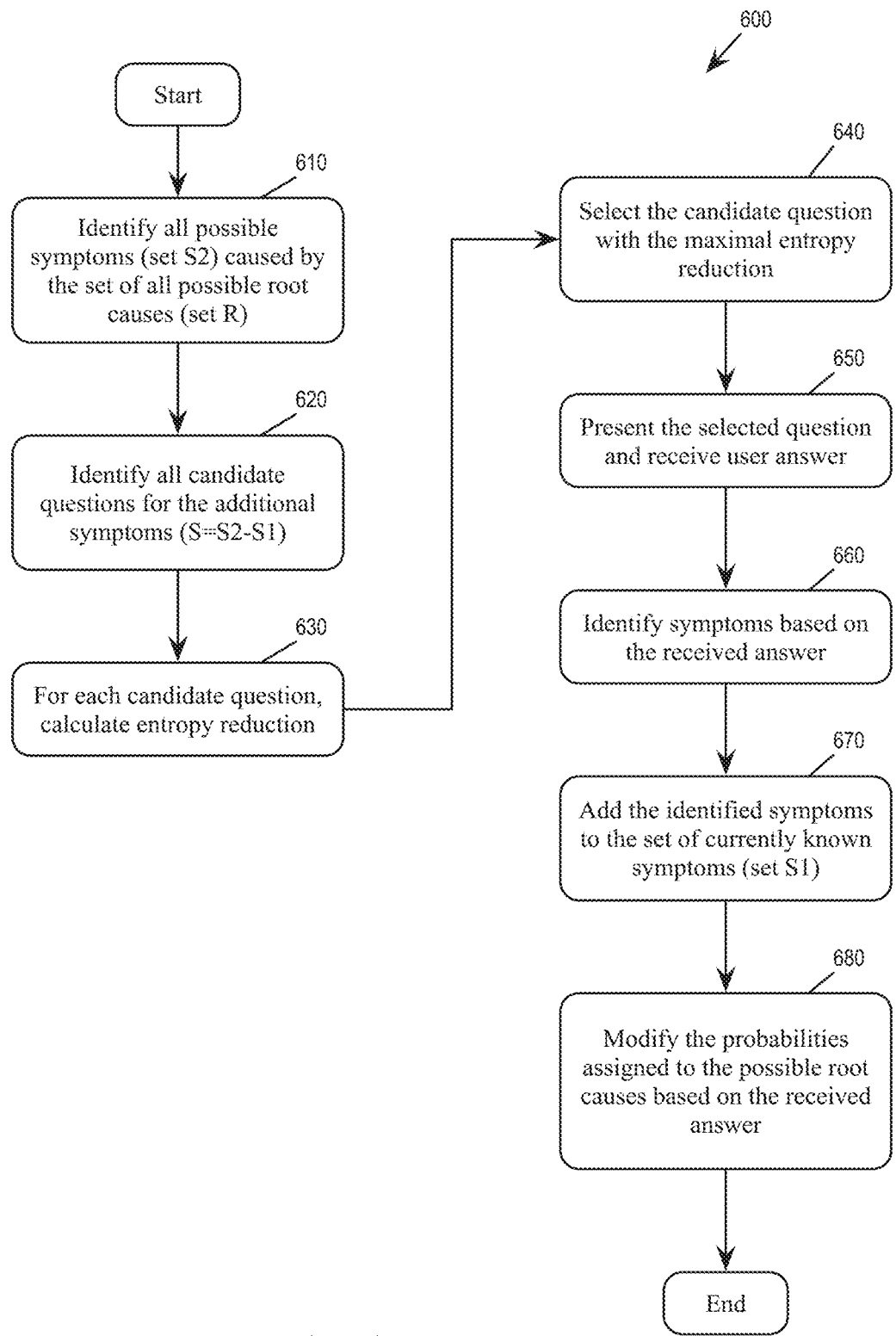
FIG. 6 conceptually illustrates a process for generating and presenting questions to the user when none of the possible root causes has a probability that exceeds a threshold, consistent with an exemplary embodiment.

FIG. 6 conceptually illustrates a process 600 for generating and presenting questions to the user when none of the possible root causes has a probability that exceeds a threshold, consistent with an exemplary embodiment. Specifically, the cognitive conversation system 100 performs the operation 600 when performing the operation 535. In some embodiments, one or more processing units (e.g., processor) of the computing device 101 implementing the cognitive conversation system 100 performs the process 600 by executing instructions stored in a computer readable medium.

The process 600 starts when the cognitive conversation system 100 identifies (at 610) all possible symptoms (set S2) caused by the set of all possible root causes (set R). The cognitive conversation system 100 then identifies (at 620) all candidate questions for the additional symptoms in a set S=S2−S1.

The cognitive conversation system 100 then calculates (at 630) an entropy reduction for each candidate question. The calculation of the entropy reduction is based on probabilities of the symptoms in the question group of the candidate question, as well as probabilities of the links between the symptoms of the question group and the possible root causes according to Eq. (2) and Eq. (3). The computation of entropy reduction is described in further detail by reference to FIG. 4 above. The cognitive conversation system 100 then selects (at 640) a candidate question with the maximum entropy reduction.

The cognitive conversation system 100 presents (at 650) the selected question and receives a user answer through the conversation conducted with the user. The cognitive conversation system 100 identifies (at 660) a symptom based on the answer. The cognitive conversation system 100 then adds (at 670) the identified symptom to the set of currently known symptoms S1. The cognitive conversation system 100 modifies (at 680) the probabilities assigned to the possible root causes in the set R based on the received answer. In some embodiments, it is possible that the newly expanded S1 may introduce new root causes to the set of root causes R. The process 600 then ends.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 5 and FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
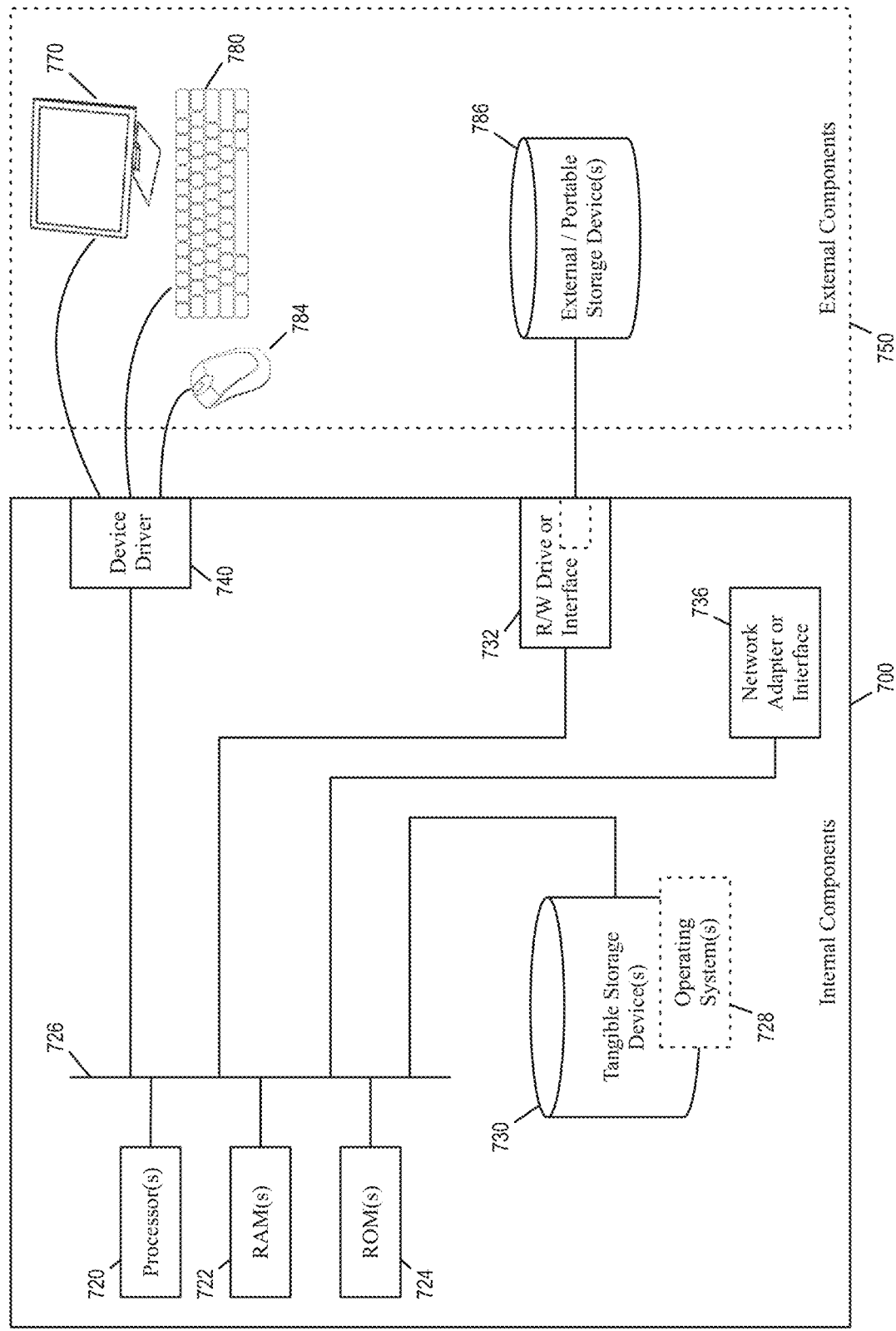
FIG. 7 shows a block diagram of the components of a data processing system in accordance with an illustrative embodiment of the present disclosure.

FIG. 7 shows a block diagram of the components of data processing systems 700 and 750 that may be used to implement virtual change manager of a database system in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 700 and a set of external components 750 illustrated in FIG. 7. The set of internal components 700 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the processes 500 and 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 700 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the processes 500 and 600 can be stored on one or more of the respective portable computer-readable tangible storage devices 786, read via the respective R/W drive or interface 732 and loaded into the respective hard drive 730.

The set of internal components 700 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 750 can include a computer display monitor 770, a keyboard 780, and a computer mouse 784. The set of external components 750 can also include touch screens, virtual keyboards, touch pads, pointing devices, and other human interface devices. The set of internal components 700 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    harvesting a set of symptoms from a conversation between the computer and a user, where the set of symptoms is related to a reported problem;
    retrieving a bipartite graph data structure that links possible root causes with possible symptoms from a memory of the computer;
    identifying, by the computer, (i) a set of possible root causes of the reported problem based on the set of symptoms and (ii) a probability for each possible root cause in the set of possible root causes, by using the bipartite graph data structure;
    identifying one or more possible symptoms in addition to the set of symptoms for the set of possible root causes;
    upon determining, by the computer, that at least one possible root cause has a probability that is higher than a threshold, presenting, as part of the conversation, an explanation or solution associated with the at least one possible root cause having a probability that is higher than the threshold; and
    upon determining, by the computer, that none of the possible root causes in the set of possible root causes has a probability higher than the threshold, presenting, as part of the conversation, a question based on an information entropy that is computed based on each of the probabilities of the identified possible root causes of the set of root causes,
    wherein the presented question is selected from a set of candidate questions that are associated with the identified possible symptoms,
    wherein selecting the question comprises identifying a candidate question among the set of candidate questions that achieves a greatest reduction in the information entropy,
    wherein the information entropy is computed based on each of the probabilities of the different possible root causes, and
    wherein the reduction in the information entropy is computed based on probabilities of (i) different possible symptoms associated with the candidate question and (ii) links between the different possible symptoms associated with the candidate question and the possible root causes.

2. The computer-implemented method of claim 1, further comprising:
    receiving an answer for the presented question;
    identifying a symptom based on the answer; and
    adding the identified symptom to the set of symptoms.

3. The computer-implemented method of claim 1, further comprising eliminating the possible root cause associated with the presented explanation or solution from the set of possible root causes upon determining that a feedback for the presented explanation or solution indicates that the explanation or solution is inappropriate for the reported problem.

4. The computer-implemented method of claim 1, further comprising updating the bipartite data structure based on a response to the presented question or the presented explanation received from the conversation.

5. The computer-implemented method of claim 4, further comprising creating the bipartite data structure by extracting the possible symptoms, the possible root causes, and relationships between the possible symptoms and the possible root causes from a set of historical records.

6. A computing device comprising:
    a processor;
    a storage device storing a set of instructions, wherein an execution of the set of instructions by the processor configures the computing device to perform acts, comprising:
    conducting a conversation over a user interface device;
    receiving a set of symptoms of a reported problem from the conversation;
    identifying (i) a set of possible root causes of the reported problem based on the set of symptoms and (ii) a probability for each possible root cause in the set of possible root causes by using a bipartite graph data structure that links possible root causes with possible symptoms;
    upon determining that at least one possible root cause has a probability that is higher than a threshold, presenting, as part of the conversation, an explanation or solution associated with the at least one possible root cause having a probability that is higher than the threshold;
    upon determining that none of the possible root causes in the set of possible root causes has a probability higher than the threshold, presenting, as part of the conversation, a question based on an information entropy that is computed based on each of the probabilities of the identified possible root causes of the set of root causes; and
    identifying one or more possible symptoms in addition to the set of symptoms for the set of possible root causes,
    wherein the presented question is selected from a set of candidate questions that are associated with the identified possible symptoms,
    wherein selecting the question comprises identifying a candidate question among the set of candidate questions that achieves a greatest reduction in the information entropy,
    wherein the information entropy is computed based on the probabilities of the different possible root causes, and
    wherein the reduction in the information entropy is computed based on probabilities of (i) different possible symptoms associated with the candidate question and (ii) links between the different possible symptoms associated with the candidate question and the possible root causes.

7. The computing device of claim 6, wherein execution of the set of instructions further configures the computing device to perform acts comprising:
    receiving an answer for the presented question;
    identifying a symptom based on the answer; and
    adding the identified symptom to the set of symptoms.

8. The computing device of claim 6, wherein execution of the set of instructions further configures the computing device to perform acts comprising:
eliminating the possible root cause associated with the presented explanation or solution from the set of possible root causes upon determining that a feedback for the presented explanation or solution indicates that the explanation or solution is inappropriate for the reported problem.

9. The computing device of claim 6, wherein execution of the set of instructions further configures the computing device to perform acts comprising updating the bipartite graph data structure based on a response to the presented question or the presented explanation received from the conversation.

10. A computer program product comprising:
one or more non-transitory computer-readable storage device and program instructions stored on at least one of the one or more non-transitory storage devices, the program instructions executable by a processor, the program instructions comprising sets of instructions for:
conducting a conversation over a user interface device;
receiving a set of symptoms of a reported problem from the conversation;
identifying (i) a set of possible root causes of the reported problem based on the set of symptoms and (ii) a probability for each possible root cause in the set of possible root causes by using a bipartite graph data structure that links possible root causes with possible symptoms;
identifying one or more possible symptoms in addition to the set of symptoms for the set of possible root causes;
upon determining that at least one possible root cause has a probability that is higher than a threshold, presenting, as part of the conversation, an explanation or solution associated with the at least one possible root cause having a probability that is higher than the threshold; and
upon determining that none of the possible root causes in the set of possible root causes has a probability higher than the threshold, presenting, as part of the conversation, a question based on an information entropy that is computed based on each of the probabilities of the identified possible root causes of the set of root causes,
wherein the presented question is selected from a set of candidate questions that are associated with the identified possible symptoms,
wherein selecting the question comprises identifying a candidate question among the set of candidate questions that achieves a greatest reduction in the information entropy,
wherein the information entropy is computed based on the probabilities of the different possible root causes, and
wherein the reduction in the information entropy is computed based on probabilities of (i) different possible symptoms associated with the candidate question and (ii) links between the different possible symptoms associated with the candidate question and the possible root causes.

11. The computer program product of claim 10, wherein the program instructions further comprising:
receiving an answer for the presented question;
identifying a symptom based on the answer; and
adding the identified symptom to the set of symptoms.

12. The computer program product of claim 10, wherein the program instructions further comprising eliminating the possible root cause associated with the presented explanation or solution from the set of possible root causes upon determining that a feedback for the presented explanation or solution indicates that the explanation or solution is inappropriate for the reported problem.

13. The computer program product of claim 10, wherein the program instructions further comprising updating the bipartite graph data structure based on a response to the presented question or the presented explanation received from the conversation.

* * * * *